United States Patent [19]

Sommargren

[11] Patent Number: 4,746,216
[45] Date of Patent: * May 24, 1988

[54] ANGLE MEASURING INTERFEROMETER

[75] Inventor: Gary E. Sommargren, Madison, Conn.

[73] Assignee: Zygo Corporation, Middlefield, Conn.

[*] Notice: The portion of the term of this patent subsequent to Jan. 5, 2005 has been disclaimed.

[21] Appl. No.: 873,420

[22] Filed: Jun. 12, 1986

Related U.S. Application Data

[63] Continuation-in-part of Ser. No. 845,926, Mar. 28, 1986.

[51] Int. Cl.$^4$ .............................................. G01B 9/02
[52] U.S. Cl. .................................... 356/349; 356/351; 356/363
[58] Field of Search ........................ 356/349, 351, 363

[56] References Cited

U.S. PATENT DOCUMENTS

| | | | |
|---|---|---|---|
| 3,656,853 | 4/1972 | Bagley et al. | 356/349 |
| 3,788,746 | 1/1974 | Baldwin et al. | 356/349 |
| 3,790,284 | 2/1974 | Baldwin | 356/349 |

OTHER PUBLICATIONS

Bennett, "A Double-Passed Michelson Interferometer", *Optics Communications*, vol. 4, No. 6, pp. 428–430, 3/72.

Primary Examiner—Davis L. Willis
Assistant Examiner—Matthew W. Koren
Attorney, Agent, or Firm—Stiefel, Gross & Kurland

[57] ABSTRACT

An angle measuring interferometer comprises a source (10) which emits a light beam containing two linear orthogonally polarized components; means, such as a tilted shear plate (16) or a beamsplitter/beam folder assembly (116, 116A) for converting the input beam into two separated, parallel, orthogonally polarized beams; a half-wave retardation plate (29A, 29) located in one of the separated beams for converting the two separated parallel orthogonally polarized beams into two separated parallel beams with the same polarization; means including a polarizing beamsplitter (44), for causing each of the separated parallel beams with the same polarization to be reflected once by each of two plane mirrors (71, 70) to produce two parallel output beams with the same polarization; a half-wave retardation plate (29B, 29) located in one of the separated parallel output beams, for converting the two separated parallel output beams of the same polarization into two separated parallel output beams with orthogonal polarization, with means, such as the tilted shear plate (16) or the beamsplitter/beam folder assembly (116, 116B), converting the two separated parallel orthogonally polarized output beams into a single output beam in which the phase difference, "$\delta$", between the two polarization components of the single output beam is directly proportional to the angle, "$\theta$", between the two plane mirrors (70, 71); a polarizer (81) for mixing the orthogonal components of the output beam; a photoelectric detector (83) to produce the measurement signal; and an electronic module (90) to indicate the phase difference, "$\Delta\delta$", which is directly proportional to the changes in the angular orientation, "$\Delta\theta$", between the two plane mirrors (70, 71).

137 Claims, 3 Drawing Sheets

ANGLE MEASURING INTERFEROMETER

CROSS REFERENCE TO RELATED APPLICATIONS

This application is a continuation-in-part of my copending U.S. patent application entitled "Angle Measuring Interferometer," filed Mar. 28, 1986, and bearing U.S. Ser. No. 845,926, the contents of which are specifically incorporated by reference herein in their entirety.

BACKGROUND OF THE INVENTION

1. Field of the Invention

The present invention relates to apparatus for the measurement of changes in angular orientation between two plane mirrors. More particularly, the invention relates to optical apparatus which is useful for high accuracy angle metrology using interferometry.

2. The Prior Art

High accuracy displacement and angle measurements are required in the machine tool industry and in the semiconductor fabrication industry. Displacement is commonly measured with an interferometer. Angles are commonly measured with either an interferometer or an autocollimator.

While there are numerous interferometer configurations which can be used to measure changes in angular orientation between two plane mirrors, none provides a high speed electrical output which is insensitive to changes in the displacement between the two mirrors. In conventional interferometers, changes in angular orientation between two mirrors manifests itself, in general, as a change in fringe spacing and a rotation of the fringe pattern while changes in the displacement between the two mirrors manifests itself as a translation of the fringes. Thus, it takes rather complex, time consuming processing to separate these effects in order to extract the desired angular information. Therefore, for high accuracy angular measurement of precision, high speed X-Y stages used in microlithography, the prior art interferometers are not used.

An adaption of a displacement interferometer has been used to make angular measurements, see for example R. R. Baldwin, L. E. Truhe, and D. C. Woodruff, "Laser Optical Components for Machine Tool and Other Calibration," *Hewlett-Packard Journal*, pp. 14–16, April 1983. However, this apparatus measures the changes in angular orientation of a pair of retroreflectors, not plane mirrors. Thus, it measures changes in angular orientation of a part which can be displaced in only one dimension, i.e., displacements parallel to the direction of the incident laser beams. Therefore, this apparatus is also not useful for the high accuracy angular measurements of precision X-Y stages.

Autocollimators provide many of the desired characteristics, see for example D. Malacara, *Optical Shop Testing*, p. 467, John Wiley & Sons (1978). However, for high accuracy measurements, interferometers are preferred because their measurements are based directly on a stable, fixed, built-in measurement unit, i.e., the wavelength of light.

The present invention retains the preferred chacteristics of both the autocollimator and the interferometer while avoiding the serious limitations of prior art apparatus. In the present invention, the angular measurement is insensitive to not one but rather to three dimensional displacements of the plane mirrors, and the measurement is interferometric so that it is based on the wavelength of light. The improvements of the present invention thusly overcome the disadvantages of the prior art and allow the high accuracy, i.e., to a small fraction of an arc second, angular measurement required for precision, high speed X-Y stages.

SUMMARY OF THE INVENTION

In accordance with the instant invention, I provide an angle measuring interferometer system capable of measuring accurately changes in the angular orientation between two plane mirrors comprising: (1) a source of an input beam with two linear orthogonally polarized components which may or may not be of the same optical frequency; (2) means, most preferably a tilted shear plate with regions of antireflection and polarizing coatings, or a beamsplitter/beam folder assembly with regions of antireflection and polarizing coatings, for converting said input beam into two separated, parallel, orthogonally polarized beams; (3) means, most preferably a half-wave retardation plate, located in one of said separated beams, for converting said two separated, parallel, orthogonally polarized beams into two separated, parallel, beams with the same polarization and frequency difference; (4) means, most preferably a polarizing beamsplitter, quarter-wave retardation plate, and retroreflector, for causing each of said separated parallel beams with the same polarization to be reflected once by each of two plane mirrors to produce two parallel output beams with the same polarization; (5) means, most preferably a half-wave retardation plate, located in one of said separated, parallel output beams for converting said two separated, parallel output beams of the same polarization into two separated, parallel output beams with orthogonal polarization; (6) means, most preferably the aforementioned tilted plate with regions of antireflection and polarizing coatings, or a beamsplitter/beam folder assembly with regions of antireflection and polarizing coatings, for converting said two separated, parallel, orthogonally polarized output beams into a single output beam in which the variation in phase difference, "$\Delta\delta$", between the two polarization components of said single output beam is directly proportional to the variation in angle, "$\Delta\theta$", between said two plane mirrors; (7) means, most preferably, a polarizer, for mixing said orthogonal components of said single output beam; (8) means, most preferably a photoelectric detector, to produce an electrical measurement signal; and (9) means to extract said variation in phase difference, "$\Delta\delta$", from said electrical measurement signal, said variation in phase difference "$\Delta\delta$", being proportional to the variation in angle between said two plane mirrors.

THE DRAWING

In the drawings,

FIG. 4 depicts in schematic form an alternative embodiment of the arrangement shown in FIG. 2 where the tilted shear plate is replaced by a beamsplitter/beam folder assembly.

DETAILED DESCRIPTION OF THE INVENTION

Figure 1:
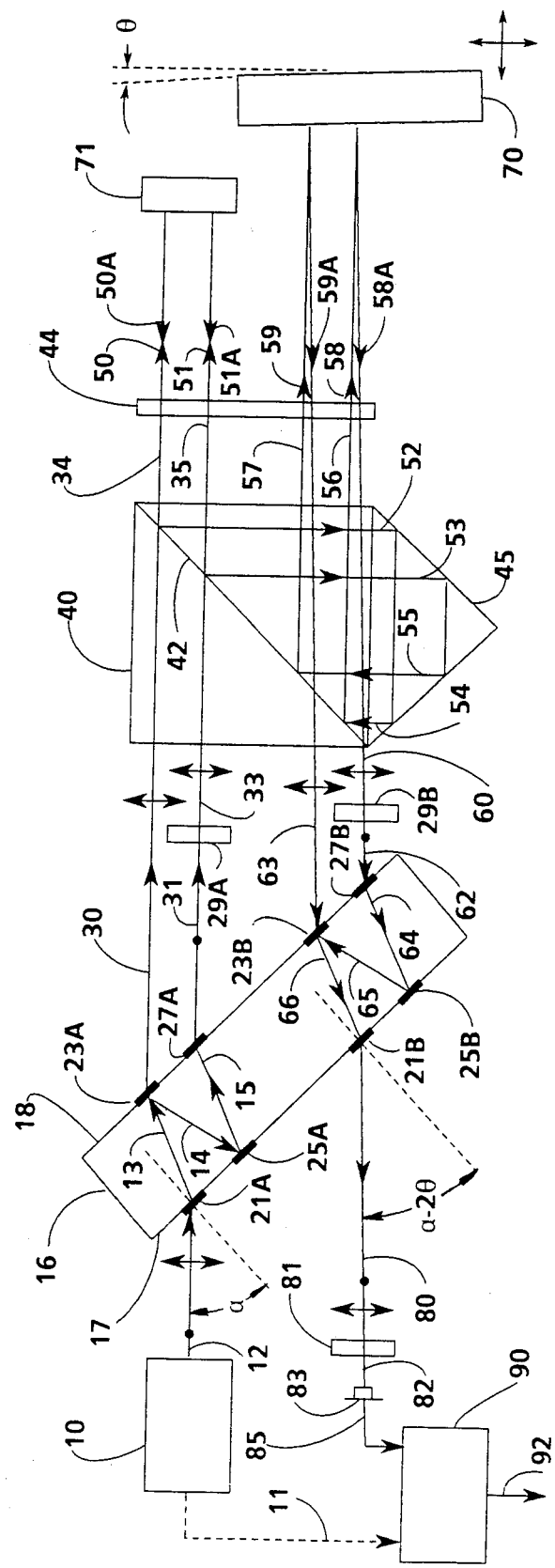
FIG. 1 depicts in schematic form one embodiment of the instant invention where all optical beams are in a single plane.

FIG. 1 depicts in schematic form one embodiment of the instant invention where all optical beams are in a single plane. While the apparatus has application for a wide range of radiation sources, the following description is taken by way of example with respect to an optical measuring system. Light source (10), which most preferably uses a laser, emits input beam (12) which is comprised of two linear orthogonally polarized components as indicated by the dot and arrow, which may or may not be of the same optical frequency. If the frequencies are the same, see for example, Downs et al. U.S. Pat. No. 4,360,271, issued Nov. 23, 1982. If the frequencies are different, see for example, Bagley et al. U.S. Pat. No. 3,458,259 issued July 26, 1969 and commonly owned, copending U.S. patent applications Ser. No. 710,859, entitled "Apparatus to Transform a Single Frequency, Linearly Polarized Laser Beam Into a Beam with Two, Orthogonally Polarized Frequencies", filed Mar. 12, 1985; Ser. No. 710,927, entitled "Heterodyne Interferometer System", filed Mar. 12, 1985; Ser. No. 710,927, entitled "Apparatus to Transform a Single Frequency, Linearly Polarized Laser Beam into a High Efficiency Beam with Two, Orthogonally Polarized Frequencies", filed Mar. 12, 1985; Ser. No. 810,999, entitled "Differential Plane Mirror Interferometer," filed Dec. 19, 1985; and the commonly owned copending contemporaneously filed application entitled "Differential Plane Mirror Interferometer Having a Beamsplitter/Beam Folder Assembly," the contents of all of which are specifically incorporated by reference herein in their entirety, in which instance source (10) would provide an electrical reference signal (11), shown by dotted lines in FIG. 1, which would correspond to the frequency difference between the two stabilized frequencies. No such reference signal (11) is provided when the two linear orthogonally polarized components comprising input beam (12) are of the same optical frequency.

Figure 3:
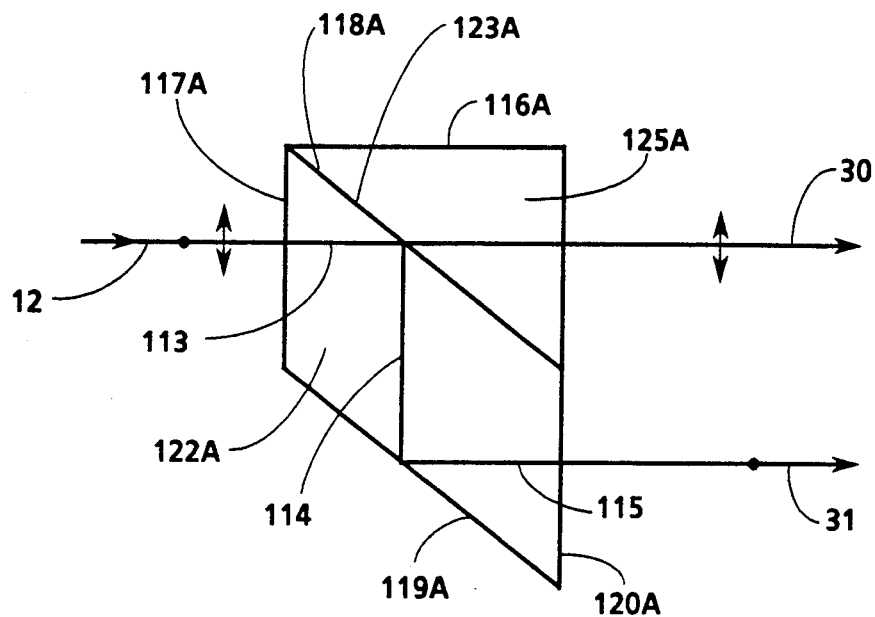
FIG. 3 depicts in schematic form an alternative embodiment of the arrangement shown in FIG. 1 where the tilted shear plate is replaced by a beamsplitter/beam folder assembly.
Figure 3:
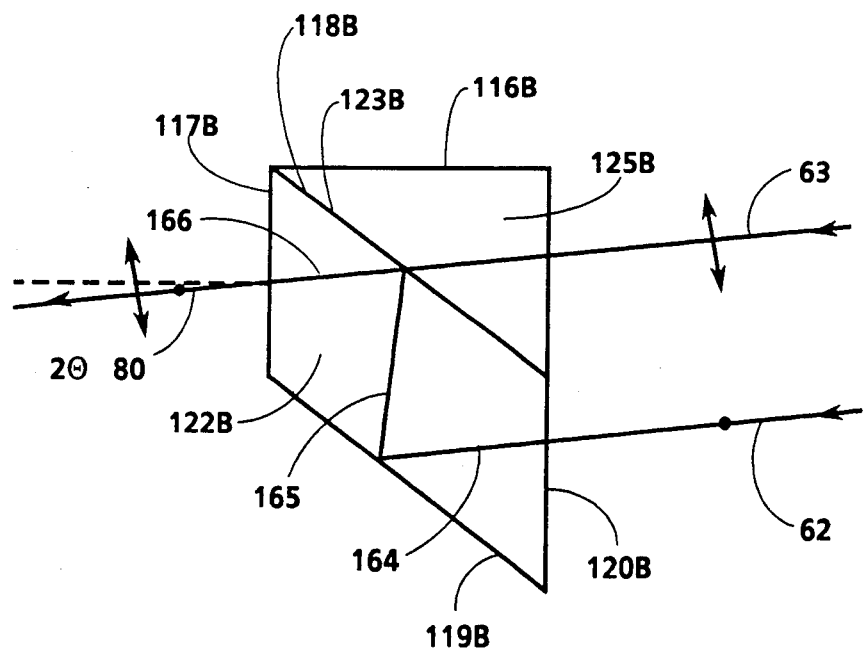

In the embodiment of FIG. 1, beam (12) is incident on shear plate (16) which is a tilted glass substrate with optically flat surfaces (17) and (18) which are mutually parallel. The function of shear plate (16) is to spatially separate the two polarization components using conventional polarization techniques. If desired, this function can be accomplished by a beamsplitter/beam folder assembly, such as illustrated in the embodiments of FIGS. 3 and 4, in place of tilted shear plate (16). Beam (12) passes through surface (17) to become beam (13) which has the same polarization as beam (12). Surface (17) has an antireflection coating (21A) over the region where beam (12) passes through it. Polarizing coating (23A) on surface (18) splits beam (13) so that one polarized component is transmitted as beam (30) whereas the other orthogonally polarized component is reflected as beam (14). Beam (14) is totally reflected from reflective coating (25A) on surface (17) to become beam (15). Beam (15) passes through surface (18) to become beam (31) which has the same polarization as beam (15). Surface (18) has an antireflection coating (27A) over the region where beam (15) passes through it.

Beam (31) passes through half-wave retardation (29A) which rotates the linear polarization of beam (31) by 90° so that resultant beam (33) has the same polarization as beam (30). Beams (30) and (33) enter polarizing beamsplitter (40) with polarizing coating (42) and are transmitted as beams (34) and (35), respectively. Beams (34) and (35) pass through quarter-wave retardation plate (44) and are converted into circularly polarized beams (50) and (51), respectively. Beams (50) and (51) are reflected from fixed reference mirror (71) to become beams (50A) and (51A). Beams (50A) and (51A) pass back through quarter-wave retardation plate (44) and are converted back into linearly polarized beams which are orthogonally polarized to the original incident beams (34) and (35). Beams (50A) and (51A) are reflected by polarizing coating (42) to become beams (52) and (53). Beams (52) and (53) are reflected by retroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59).

Beams (58) and (59) are reflected from movable mirror (70) to become beams (58A) and (59A). Beams (58A) and (59A) pass back through quarter-wave retardation plate (44) and are converted back into linearly polarized beams which are polarized the same as the original incident beams (34) and (35). Beams (58A) and (59A) are transmitted by polarized coating (42) and leave polarizing beamsplitter (40) as beams (60) and (63). Beams (60) and (63) are mutually parallel, independent of any tilt that may be present between mirrors (70) and (71). Beam (60) passes through half-wave retardation plate (29B) which rotates the linear polarization of beam (60) by 90° so that resultant beam (62) has a linear polarization which is orthogonal to beam (63). Beam (62) passes through surface (18) to become beam (64) which has the same polarization as beam (62). Surface (18) has an antireflection coating (27B) over the region where beam (62) passes through it. Beam (64) is totally reflected from reflective coating (25B) to become beam (65). Surface (18) has reflective coating (25B) over the region where beam (64) intersects it. Beams (65) and (63) are recombined to form beam (66) by polarizing coating (23B). Surface (17) has polarizing coating (23B) over the region where beams (65) and (63) intersect. Beam (66) passes through surface (17) to become beam (80). Surface (17) has an antireflection coating (21B) over the region where beam (65) passes through it.

Beam (80), like input beam (12), has two polarization components which are orthogonally polarized. Each polarization component has traversed exactly the same optical path length (through air and glass) except for the optical path length difference through shear plate (16) due to angular tilt between mirrors (70) and (71). This results in a phase difference, "δ", between the two polarization components of beam (80) and is given by $$\delta = \frac{4\pi h n}{\lambda} \left[ \sqrt{1 - \left(\frac{\sin(\alpha - 2\theta)}{n}\right)^2} - \sqrt{1 - \left(\frac{\sin\alpha}{n}\right)^2} \right]$$

where "h" is the thickness of shear plate (16), "n" is the refractive index of shear plate (16), "λ" is the wavelength of light source (10), "α" is the angle of incidence of beam (12) on shear plate (16) and "θ" is the angular tilt of mirror (70) in the plane of beams (58) and (59). Only tilt, or a compound of tilt, in this plane will cause "δ" to vary. Translation of mirror (70) will not influence "δ". Small variations in the tilt, "Δθ", are directly proportional to variations in phase difference, "Δδ" and are approximately given by $$\Delta\theta = \frac{n\lambda}{4\pi h} \frac{\sqrt{1 - \left(\frac{\sin\alpha}{n}\right)^2}}{\sin 2\alpha} \Delta\delta$$

This phase variation is measured by passing beam (80) through polarizer (81), oriented at 45° to each polarization component, which mixes the two orthogonally polarized components in beam (80) to give beam (82). The interference between the two polarization components is detected by photodetector (83) producing electrical signal (85). Electronic module (90) extracts the variation in phase difference from electrical signal (85). When the two polarization components of beam (12) are of the same optical frequency, module (90) does not require reference signal (11) since there is no corresponding frequency difference, and conventionally extracts the phase variation from signal (85) such as in the manner described in U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which instance photodetector (83) would detect the interference between the two frequency components as a sinusoidal intensity variation with a frequency approximately equal to the difference frequency between the two components of beam (12), such as described in the aforementioned copending U.S. patent application Ser. Nos. 710,928 and 810,999, and electronic module (90) would preferably comprise a phase meter accumulator, such as described therein. In either event, electronic module (90) provides output (92) which is directly proportional to the change in tilt between mirrors (70) and (71). This optical configuration is extremely insensitive to measurement error because changes in the other optical components, such as those induced mechanically or thermally, affect both polarization components equally and therefore have no influence on the measured phase variation (92). In addition, environmental effects, such as variations in the refractive index of air, can be minimized by placing mirror (71) close to mirror (70) to reduce the optical path length difference between the two polarization components. It should be noted that half-wave retardation plates (29A) and (29B) could be a single element with a hole in it to allow beam (63) to pass through it unaffected.

Figure 2:
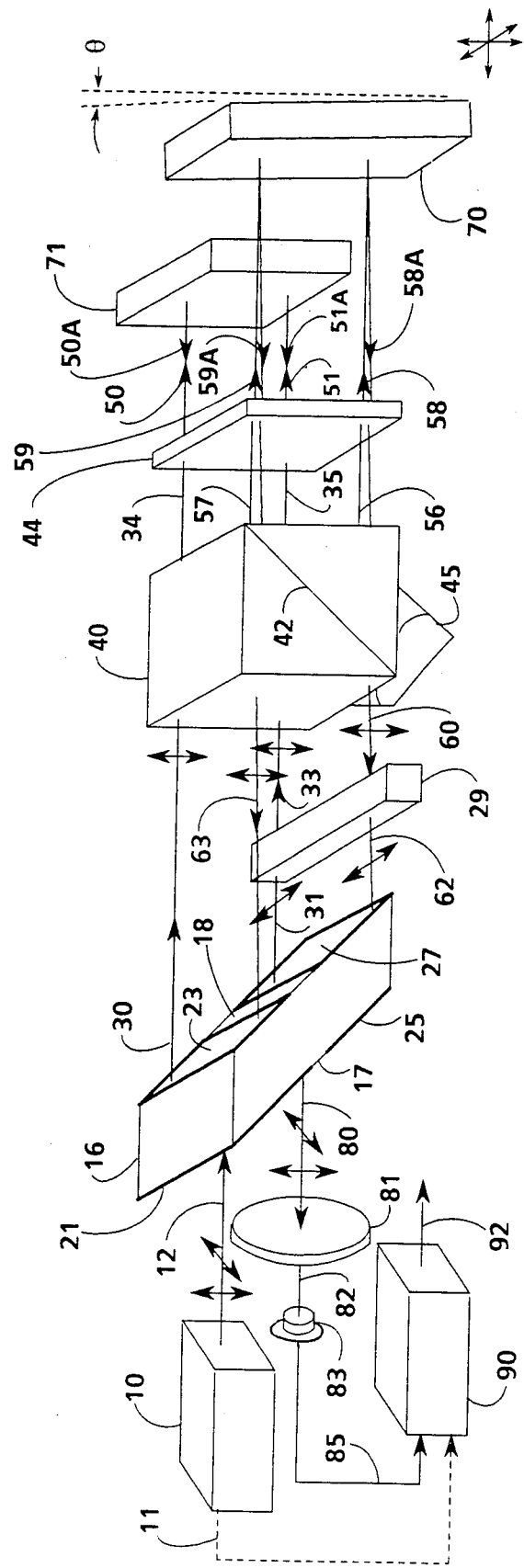
FIG. 2 depicts in schematic form a second embodiment of the instant invention where the optical beams are not in a single plane.

FIG. 2 depicts in schematic form a second embodiment of the instant invention where the optical beams are not in a single plane. This configuration permits a more compact optical system. The description of this figure is identical to FIG. 1 and is numbered correspondingly. The only differences are that now coatings (21A) and (21B), (23A) and (23B), (25A) and (25B), and (27A) and (27B) in FIG. 1 become coatings (21), (23), (25), and (27), respectively; and half-wave retardation plates (29A) and (29B) in FIG. 1 become single half-wave retardation plate (29).

Thus, in FIG. 2, light source (10), which as previously mentioned, most preferably uses a laser, emits input beam (12) which is comprised of two linear orthogonally polarized components as indicated by the two arrows, which again, may or may not be of the same optical frequency. Just as was mentioned with reference to FIG. 1, when the two linear orthogonally polarized components of beam (12) differ in frequency, source (10) provides an electrical reference signal (11), shown by dotted lines in FIG. 2, corresponding to this frequency difference, with no such reference signal (11) being provided when the two linear orthogonally polarized components comprising input beam (12) are of the same optical frequency. Beam (12) is incident on shear plate (16) which is a tilted glass substrate with optically flat surfaces (17) and (18) which are mutually parallel. The function of shear plate (16) is to spatially separate the two polarization components using conventional polarization techniques. Again, this function can also be accomplished by a beamsplitter/beam folder assembly if desired. Thus, in the embodiment of FIG. 2, beam (12) is divided by shear plate (16), with aid of antireflection coatings (21) and (27), polarizing coating (23) and reflective coating (25), to become vertically polarized beam (30) and horizontally polarized beam (31). Beam (31) passes through the single half-wave retardation plate (29) which rotates the linear polarizatioin of beam (31) by 90° so that resultant beam (33) has the same polarization as beam (30). Beams (30) and (33) enter polarizing beamsplitter (40) with polarizing coating (42) and are transmitted as beams (34) and (35), respectively. Beams (34) and (35) pass through quarter-wave retardation plate (44) and are converted into circularly polarized beams (50) and (51), respectively. Beams (50) and (51) are reflected from fixed reference mirror (71) to become beams (50A) and (51A). Beams (50A) and (51A) pass back through quarter-wave retardation plate (44) and are converted back into linearly polarized beams that are orthogonally polarized to the original incident beams (34) and (35). Beams (50A) and (51A) are reflected by polarizing coating (42), retroreflector (45), and polarizing coating (42) a second time to become beams (56) and (57). Beams (56) and (57) pass through quarterwave retardation plate (44) and are converted into circularly polarized beams (58) and (59). Beams (58) and (59) are reflected from movable mirror (70) to become beams (58A) and (59A). Beams (58A) and (59A) pass back through quarter-wave retardation plate (44) and are converted back into linearly polarized beams that are polarized the same as the original incident beams (34) and (35). Beams (58A) and (59A) are transmitted by polarized coating (42) and leave polarizing beamsplitter (40) as beams (60) and (63). Beams (60) and (63) are mutually parallel, independent of any tilt that may be present between mirrors (70) and (71). Beam 60 passes through the single half-wave retardation plate (29) which rotates the linear polarization of beam (60) by 90° so that resultant beam (62) has a linear polarization which is orthogonal to beam (63). Beams (62) and (63) are combined by shear plate (16), with the aid of antireflection coatings (21) and (27), polarizing coating (23) and reflective coating (25), to become beam (80).

Once again beam (80), in the embodiment of FIG. 2, like input beam (12), has two polarization components which are orthogonally polarized. Each polarization component, as was true with the FIG. 1 embodiment, has traversed exactly the same optical path length (through air and glass) except for the optical path length difference through shear plate (16) due to angular tilt between mirrors (70) and (71). This results in a phase difference, "δ", between the two polarization components of beam (80) and is given by $$\delta = \frac{4\pi h n}{\lambda}\left[\sqrt{1-\left(\frac{\sin(\alpha-2\theta)}{n}\right)^2}-\sqrt{1-\left(\frac{\sin\alpha}{n}\right)^2}\right]$$

where "h" is the thickness of shear plate (16), "n" is the refractive index of shear palte (16), "λ" is the wavelength of light source (10), "α" is the angle of incidence of beam (12) on shear plate (16) and "θ" is the angular tilt of mirror (70) in the plane of beams (58) and (59). Only tilt, or a component of tilt, in this plane will cause "δ" to vary. Translation of mirror (70) will not influence "δ". Small variations in the tilt, "Δθ", are directly proportional to variations in phase difference, "Δθ", and are approximately given by $$\Delta\theta = \frac{n\lambda}{4\pi h}\frac{\sqrt{1-\left(\frac{\sin\alpha}{n}\right)^2}}{\sin2\alpha}\Delta\delta$$

This phase variation is measured by passing beam (80) through polarizer (81), oriented at 45° to each polarization component, which mixes the two orthogonally polarized components in beam (80) to give beam (82). As was also true on the FIG. 1 embodiment, the interference between the two frequency components is detected by photodetector (83) producing electrical signal (85). Electronic module (90) extracts the variation in phase difference from electrical signal (85). Again, as was also true with respect to the Figure embodiment, when the two polarization components of beam (12) are of the same optical frequency, module (90) does not require reference signal (11) since there is no corresponding frequency difference, and conventionally extracts the phase variation from signal (85) such as in the manner described in U.S. Pat. No. 4,360,271. However, when the two polarization components of beam (12) are of different frequencies, an additional sinusoidal electrical reference signal (11) equal in frequency to the difference between the two optical frequencies is required by electronic module (90), which difference signal (11), as previously mentioned, would be provided from source (10) in which instance photodetector (83) would detect the interference between the two frequency components as a sinusoidal intensity variation with a frequency approximately equal to the difference between the two components of beam (12), such as described in the aforementioned copending U.S. patent application Ser. Nos. 710,928 and 810,999, and electronic module (90) would preferably comprise a phase meter accumulator, such as described therein. In either event, electronic module (90) provides output (92), which as previously mentioned with respect to the FIG. 1 embodiment, is directly proportional to the change in tilt between mirrors (70) and (71). Thus, both the FIGS. 1 and 2 embodiments employ optical configurations which are extremely insensitive to measurement error because changes in the other optical components, such as those induced mechanically or thermally, affect both polarization components equally and therefore have no influence on the measured phase variation (92). In addition, as was previously mentioned with reference to the FIG. 1 embodiment, environmental effects, such as variations in the refractive index of air, can be minimized by placing mirror (71) close to mirror (70) to reduce the optical path length difference between the two polarization components.

Although the configuration depicted in FIGS. 1 and 2 is the preferred embodiment, shear plate (16) may be replaced by one of a variety of optical elements which spatially separate the two polarization components of beam (12) to give two mutually parallel and orthogonally polarized beams (30) and (31) and which also recombine beams (62) and (63) to give a single beam (80) comprised of the two orthogonally polarized components. One such optical element is shown in FIGS. 3 and 4.

FIG. 3 depicts in schematic form one alternative to shear plate (16), which is shown in FIG. 1, where all the optical beams are in a single plane. This optical element is comprised of two beamsplitter/beam folder assemblies (116A) and (116B). In turn, beamsplitter/beam folder assemblies (116A) and (116B) are comprised of right angle prisms (125A) and (125B), and rhomboid prisms (122A) and (122B) respectively. Beam (12) passes through surface (117A) to become beam (113) which has the same polarization as beam (12). Surface (117A) has an antireflection coating over the region where beam (12) passes through it. Polarizing coating (123A) on surface (118A) splits beam (113) so that one polarized component is transmitted as beam (30) whereas the other orthogonally polarized component is reflected as beam (114). Beam (114) is reflected by surface (119A) with its state of polarization unaltered to become beam (115). Beam (115) passes through surface (120A) to become beam (31) which has the same polarization as beam (115) and which is parallel to beam (30). Surface (120A) has an antireflection coating over the regions where beams pass through it.

Return beams (62) and (63) are incident on beamsplitter/beam folder (116B). Beam (62) passes through surface (120B) to become beam (164) which has the same polarization as beam (62). Surface (120B) has an antireflection coating over the regions where beams pass through it. Beam (164) is totally reflected by surface (119B) with its state of polarization unaltered to become beam (165). Beams (165) and (63) are recombined to form beam (166) by polarizing coating (123B). Surface (118B) has polarizing coating (123B) over the region where beams (165) and (63) intersect. Beam (166) passes through surface (117B) to become beam (80). Surface (117B) has an antireflection coating over the region where beam (166) passes through it.

If desired, a single beamsplitter/beam folder assembly could be constructed to functionally perform the operations of the two beamsplitter/beam folder assemblies (116A) and (116B) without departing from the spirit and scope of the present invention, such as illustrated in the embodiment of FIG. 4.

FIG. 4 depicts in schematic form a second embodiment of the beamsplitter/beam folder where the optical beams are not in a single plane. This configuration permits a more compact optical system. The description of this figure is identical to FIG. 3 and is numbered correspondingly. The only differences are that now the two beamsplitter/beam folder assemblies (116A) and (116B) illustrated in the embodiments of FIG. 3 are replaced by a single beamsplitter/beam folder assembly (116) comprised of right angle prism (125) and rhomboid prism (122). Beam (12) is divided by beamsplitter/beam folder assembly (116) with aid of antireflection coatings on surfaces (117) and (120) and polarizing coating (123) on surface (118) to become vertically polarized beam (30) and horizontally polarized beam (31). Return beams (62) and (63) are recombined by beamsplitter/beam folder assembly (116) with aid of antireflection coatings on surfaces (117) and (120) and polarizing coating (123) on surface (118) to become beam (80).

Using the beamsplitter/beam folder assembly (116A, 116B, 116) in FIGS. 3 and 4 produces a resultant phase difference, "$\delta$", between the two polarization components of beam (80) now given by $$\delta = \frac{4\pi n h}{\sqrt{2}\,\lambda}\left[\frac{\sin 2\theta}{n} + \sqrt{1 - \left(\frac{\sin 2\theta}{n}\right)^2} - 1\right]$$

where "h" is now the thickness of the rhomboid prism, "n" is the refractive index of the rhomboid prism, "$\lambda$" is the wavelength of the light source, and "$\theta$" is the angular tilt of the pair of plane mirrors with respect to each other. Small variations in the tilt, "$\Delta\theta$", are now approximately given by $$\Delta\theta = \frac{\sqrt{2}}{2}\left(\frac{\lambda}{4\pi h}\right)\Delta\delta$$

where "$\Delta\delta$" is the variation in the phase difference "$\delta$".

The principal advantages of the instant invention are: (1) it uses plane mirrors rather than retroreflectors; (2) the measurement accommodates and is insensitive to mirror translation in three dimensions; (3) the measurements are based on the wavelength of light, and (4) high speed measurements can be made.

While a preferred embodiment of the invention has been disclosed, obviously modification can be made therein, without departing from the scope of the invention as defined in the following claims.

What is claimed is:

1. An angle measuring plane mirror interferometric system comprising: a pair of plane mirrors being angularly variable with respect to each other by a variable angle between said pair of plane mirrors; source means for emitting an input beam comprising two stabilized orthogonally polarized optical frequencies; means optically coupled to said input beam for converting said input beam into two separated parallel orthogonally polarized beams; means optically disposed in the path of one of said two separated parallel orthogonally polarized beams for converting said two separated parallel orthogonally polarized beams into two separated parallel beams having the same polarization; means optically coupled to said two separated parallel same polarized beams for causing each of said separated parallel same polarized beams to be reflected once by each one of said pair of angularly variable plane mirrors to produce two parallel output beams having the same polarization; means optically disposed in the path of one of said two separated same polarized parallel output beams for converting said two separated same polarized parallel output beams into two separated orthogonally polarized parallel output beams; means optically coupled to said two separated parallel orthogonally polarized output beams for converting said two separated parallel orthogonally polarized output beams into a single output beam having a pair of orthogonally polarized frequency components, with a phase difference therebetween being directly proportional to said variable angle between said pair of plane mirrors; means optically coupled to said single output beam for mixing said orthogonally polarized components thereof and producing an electrical measurement signal therefrom; and means operatively connected to said electrical measurement signal for extracting a difference in phase from said electrical measurement signal, variations in said extracted phase difference being proportional to angular changes in said variable angle between said pair of plane mirrors; whereby an optical configuration in which the angular measurements are extremely insensitive to three dimensional displacement of said plane mirrors is provided for said interferometric system.

2. An angle measuring plane mirror interferometric system in accordance with claim 1 wherein said means for converting said two separated parallel orthogonally polarized output beams into said single output beam having said pair of orthogonally polarized frequency components comprises a shear plate means.

3. An angle measuring plane mirror interferometric system in accordance with claim 2, wherein said shear plate means comprises means for providing said pair of orthogonally polarized frequency components with said phase difference "$\delta$" in accordance with the expression $$\delta = \frac{4\pi h n}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of said shear plate, "n" is the refractive index of said shear plate, "$\lambda$" is the wavelength of said input beam source means, "$\alpha$" is the angle of incidence of said input beam on said shear plate and "$\theta$" is the angular tilt of said pair of plane mirrors with respect to each other.

4. An angle measuring plane mirror interferometric system in accordance with claim 3 wherein said angular change "$\Delta\theta$" for small variations in said angular tilt is defined by the expression $$\Delta\theta = \frac{n\lambda}{4\pi h}\,\frac{\sqrt{1 - \left(\frac{\sin\alpha}{n}\right)^2}}{\sin 2\alpha}\,\Delta\delta$$

where "$\Delta\delta$" is the variation in said phase difference.

5. An angle measuring plane mirror interferometric system in accordance with claim 3 wherein said source means comprises a laser.

6. An angle measuring plane mirror interferometric system in accordance with claim 5 wherein one of said pair of angularly variable plane mirrors is fixed and comprises a reference mirror and the other of said pair of plane mirrors is tiltable for providing said variable angle between said pair of angularly variable plane mirrors.

7. An angle measuring plane mirror interferometric system in accordance with claim 3 wherein one of said pair of angularly variable plane mirrors is fixed and comprises a reference mirror and the other of said pair of plane mirrors is tiltable for providing said variable angle between said pair of angularly variable plane mirrors.

8. An angle measuring plane mirror interferometric system in accordance with claim 14 wherein said source means comprises a laser.

9. An angle measuring plane mirror interferometric system in accordance with claim 8 wherein one of said pair of angularly variable plane mirrors is fixed and comprises a reference mirror and the other of said pair of plane mirrors is tiltable for providing said variable angle between said pair of angularly variable plane mirrors.

10. An angle measuring plane mirror interferometric system in accordance with claim 14 wherein one of said pair of angularly variable plane mirrors is fixed and comprises a reference mirror and the other of said pair of plane mirrors is tiltable for providing said variable angle between said pair of angularly variable plane mirrors.

11. An angle measuring plane mirror interferometric system in accordance with claim 2 wherein said shear plate means comprises a tilted shear plate means.

12. An angle measuring plane mirror interferometric system in accordance with claim 11 wherein said tilted shear plate means comprises means for providing said pair of orthogonally polarized frequency components with said phase difference "$\delta$" in accordance with the expression $$\delta = \frac{4\pi hn}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of said shear plate, "n" is the refractive index of said shear plate, "$\lambda$" is the wavelength of said input beam source means, "$\alpha$" is the angle of incidence of said input beam on said shear plate and "$\theta$" is the angular tilt of said pair of plane mirrors with respect to each other.

13. An angle measuring plane mirror interferometric system in accordance with claim 12 wherein said angular change "$\Delta\theta$" for small variations in said angular tilt is defined by the expression $$\Delta\theta = \frac{n\lambda}{4\pi h} \frac{\sqrt{1 - \left(\frac{\sin\alpha}{n}\right)^2}}{\sin 2\alpha} \Delta\delta$$

where "$\Delta\delta$" is the variation in said phase difference.

14. An angle measuring plane mirror interferometric system in accordance with claim 13 wherein said source means comprises a laser.

15. An angle measuring plane mirror interferometric system in accordance with claim 12 wherein said source means comprises a laser.

16. An angle measuring plane mirror interferometric system in accordance with claim 1 wherein said source means emits said input beam comprising two stabilized orthogonally polarized optical frequencies which are of the same value.

17. An angle measuring plane mirror interferometric system in accordance with claim 16 wherein said means for converting said two separated parallel orthogonally polarized output beams into said single output beam having said pair of orthogonally polarized frequency components comprises a shear plate means.

18. An angle measuring plane mirror interferometric system in accordance with claim 17 wherein said shear plate means comprises means for providing said pair of orthogonally polarized frequency components with said phase difference "$\delta$" in accordance with the expression $$\delta = \frac{4\pi hn}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of said shear plate, "n" is the refractive index of said shear plate, "$\lambda$" is the wavelength of said input beam source means, "$\alpha$" is the angle of incidence of said input beam on said shear plate and "$\theta$" is the angular tilt of said pair of plane mirrors with respect to each other.

19. An angle measuring plane mirror interferometric system in accordance with claim 18 wherein said angular change "$\Delta\theta$" for small variations in said angular tilt is defined by the expression $$\Delta\theta = \frac{n\lambda}{4\pi h} \frac{\sqrt{1 - \left(\frac{\sin\alpha}{n}\right)^2}}{\sin 2\alpha} \Delta\delta$$

where "$\Delta\theta$" is the variation in said phase difference.

20. An angle measuring plane mirror interferometric system in accordance with claim 18 wherein said source means comprises a laser.

21. An angle measuring plane mirror interferometric system in accordance with claim 20 wherein one of said pair of angularly variable plane mirrors is fixed and comprises a reference mirror and the other of said pair of plane mirrors is tiltable for providing said variable angle between said pair of angularly variable plane mirrors.

22. An angle measuring plane mirror interferometric system in accordance with claim 18 wherein one of said pair of angularly variable plane mirrors is fixed and comprises a reference mirror and the other of said pair of plane mirrors is tiltable for providing said variable angle between said pair of angularly variable plane mirrors.

23. An angle measuring plane mirror interferometric system in accordance with claim 19 wherein said source means comprises a laser.

24. An angle measuring plane mirror interferometric system in accordance with claim 23 wherein one of said pair of angularly variable plane mirrors is fixed and comprises a reference mirror and the other of said pair of plane mirrors is tiltable for providing said variable angle between said pair of angularly variable plane mirrors.

25. An angle measuring plane mirror interferometric system in accordance with claim 19 wherein one of said pair of angularly variable plane mirrors is fixed and comprises a reference mirror and the other of said pair of plane mirrors is tiltable for providing said variable angle between said pair of angularly variable plane mirrors.

26. An angle measuring plane mirror interferometric system in accordance with claim 17 wherein said shear plate means comprises a tilted shear plate means.

27. An angle measuring plane mirror interferometric system in accordance with claim 26 wherein said tilted shear plate means comprises means for providing said pair of orthogonally polarized frequency components with said phase difference "$\theta$" in accordance with the expression $$\delta = \frac{4\pi hn}{\lambda}\left[\sqrt{1 - \left(\frac{\sin(\alpha - 2\theta)}{n}\right)^2} - \sqrt{1 - \left(\frac{\sin\alpha}{n}\right)^2}\right]$$

where "h" is the thickness of said shear plate, "n" is the refractive index of said shear plate, "$\lambda$" is the wavelength of said input beam source means, "$\alpha$" is the angle of incidence of said input beam on said shear plate and "$\theta$" is the angular tilt of said pair of plane mirrors with respect to each other.

28. An angle measuring plane mirror interferometric system in accordance with claim 27 wherein said angular change "$\Delta\theta$" for small variations in said angular tilt is defined by the expression $$\Delta\theta = \frac{n\lambda}{4\pi h} \frac{\sqrt{1 - \left(\frac{\sin\alpha}{n}\right)^2}}{\sin 2\alpha} \Delta\delta$$

where "$\Delta\theta$" is the variation in said phase difference.

29. An angle measuring plane mirror interferometric system in accordance with claim 28 wherein said source means comprises a laser.

30. An angle measuring plane mirror interferometric system in accordance with claim 27 wherein said source means comprises a laser.

31. An angle measuring plane mirror interferometric system in accordance with claim 11 wherein said tilted shear plate means comprises a first set of regions of antireflection and polarizing coatings, said means for converting said two separated parallel orthogonally polarized output beams into said single output mean comprising said first set of regions and coatings on said tilted shear plate means, said tilted shear plate means further comprising a second set of regions of antireflection and polarization coatings, said second set of regions and coatings comprising said input beam converting means.

32. An angle measuring plane mirror interferometric system in accordance with claim 26 wherein said tilted shear plate means comprises a first set of regions of antireflection and polarizing coatings, said means for converting said two separated parallel orthogonally polarized output beams into said single output mean comprising said first set of regions and coatings on said tilted shear plate means, said tilted shear plate means further comprising a second set of regions of antireflection and polarization coatings, said second set of regions and coatings comprising said input beam converting means.

33. An angle measuring plane mirror interferometric system in accordance with claim 2 wherein said means for converting said two separated parallel orthogonally polarized beams into said two same polarized separated parallel beams comprises a half-wave retardation plate means.

34. An angle measuring plane mirror interferometric system in accordance with claim 17 wherein said means for converting said two separated parallel orthogonally polarized beams into said two same polarized separated parallel beams comprises a half-wave retardation plate means.

35. A angle measuring plane mirror interferometric system in accordance with claim 2 wherein said means for causing each of said separated parallel same polarized beams to be reflected once by each one of said pair of angularly variable plane mirrors comprises a polarizing beam splitter means and a retroreflector means.

36. An angle measuring plane mirror interferometric system in accordance with claim 35 wherein said means for causing each of said separated parallel same polarized beams to be reflected once by each one of said pair of angularly variable plane mirrors further comprises a quarter-wave retardation plate means.

37. An angle measuring plane mirror interferometric system in accordance with claim 17 wherein said means for causing each of said separated parallel same polarized beams to be reflected once by each one of said pair of angularly variable plane mirrors comprises a polarizing beam splitter means and a retroreflector means.

38. An angle measuring plane mirror interferometric system in accordance with claim 37 wherein said means for causing each of said separated parallel same polarized beams to be reflected once by each one of said pair of angularly variable plane mirrors further comprises a quarter-wave retardation plate means.

39. An angle measuring plane mirror interferometric system in accordance with claim 2 wherein said means for converting said two separated parallel same polarized output beams into said two separated parallel orthogonally polarized output beams comprises a half-wave retardation plate means.

40. An angle measuring plane mirror interferometric system in accordance with claim 17 wherein said means for converting said two separated parallel same polarized output beams into said two separated parallel orthogonally polarized output beams comprises a half-wave retardation plate means.

41. An angle measuring plane mirror interferometric system in accordance with claim 2 wherein said means for producing said electrical measurement signal comprises a polarizer means for mixing said single output beam orthogonal components.

42. An angle mesuring plane mirror interferometric system in accordance with claim 41 wherein said means for producing said electrical measurement signal further comprises a photoelectric detector.

43. An angle measuring plane mirror interferometric system in accordance with claim 17 wherein said means for producing said electrical measurement signal comprises a polarizer means for mixing said single ouput beam orthogonal components.

44. An angle measuring plane mirror interferometric system in accordance with claim 43 wherein said means for producing said electrical measurement signal comprises a polarizer means for mixing said single output beam orthogonal components.

45. An angle measuring plane mirror interferometric system in accordance with claim 31 wherein said means for converting said two separated parallel orthogonally polarized beams into said two same polarized separated parallel beams comprises a half-wave retardation plate means.

46. An angle measuring plane mirror interferometric system in accordance with claim 32 wherein said means for converting said two separated parallel orthogonally polarized beams into said two same polarized separated parallel beams comprises a half-wave retardation plate means.

47. An angle measuring plane mirror interferometric system in accordance with claim 31 wherein said means for causing each of said separated parallel same polarized beams to be reflected once by each one of said pair of angularly variable plane mirrors comprises a polarizing beam splitter means and a retroreflector means.

48. An angle measuring plane mirror interferometric system in accordance with claim 47 wherein said means for causing each of said separated parallel same polarized beams to be reflected once by each one of said pair of angularly variable plane mirrors comprise a polarizing beam splitter means and a retroreflector means.

49. An angle measuring plane mirror interferometric system in accordance with claim 48 wherein said means for converting said two separated parallel same polarized output beams into said two separated parallel orthogonally polarized output beams comprises a half-wave retardation plate means.

50. An angle measuring plane mirror interferometric system in accordance with claim 49 wherein said means for producing said electrical measurement signal comprises a polarizer means for mixing said single output beam orthogonal components.

51. An angle measuring plane mirror interferometric system in accordance with claim 19 wherein said means for causing each of said separated parallel same polarized beams to be reflected once by each one of said pair of angularly variable plane mirrors comprises a polarizing beam splitter means and a retroreflector means.

52. An angle measuring plane mirror interferometric system in accordance with claim 51 wherein said means for causing each of said separated parallel same polarized beams to be reflected once by each one of said pair of angularly variable plane mirrors comprises a polarizing beam splitter means and a retroreflector means.

53. An angle measuring plane mirror interferometric system in accordance with claim 53 wherein said means for converting said two separated parallel same polarized output beams into said two separated parallel orthogonally polarized output beams comprises a half-wave retardation plate means.

54. An angle measuring plane mirror interferometric system in accordance with claim 53 wherein said means for producing said electrical measurement signal comprises a polarizer means for mixing said single output beam orthogonal components.

55. An angle measuring plane mirror interferometric system in accordance with claim 2 wherein said source means comprises a laser.

56. An angle measuring plane mirror interferometric system in accordance with claim 17 wherein said source means comprises a laser.

57. An angle measuring plane mirror interferometric system in accordance with claim 2 wherein one of said pair of angularly variable plane mirrors is fixed and comprises a reference mirror and the other of said pair of plane mirrors is tiltable for providing said variable angle between said pair of angularly variable plane mirrors.

58. An angle measuring plane mirror interferometric system in accordance with claim 57 wherein said source means comprises a laser.

59. An angle measuring plane mirror interferometric system in accordance with claim 17 wherein one of said pair of angularly variable plane mirrors is fixed and comprises a reference mirror and the other of said pair of plane mirrors is tiltable for providing said variable angle between said pair of angularly variable plane mirrors.

60. An angle measuring plane mirror interferometric system in accordance with claim 59 wherein said source means comprises a laser.

61. An angle measuring plane mirror interferometric system in accordance with claim 2 wherein all of said beams are in a single plane.

62. An angle measuring plane mirror interferometric system in accordance with claim 61 wherein all of said beams are optical beams and all of said optical beams are in a single plane.

63. An angle measuring plane mirror interferometric system in accordance with claim 17 wherein all of said beams are in a single plane.

64. An angle measuring plane mirror interferometric system in accordance with claim 63 wherein all of said beams are optical beams and all of said optical beams are in a single plane.

65. An angle measuring plane mirror interferometric system in accordance with claim 31 wherein said tilted shear plate comprises both said first and second set of regions and coatings.

66. An angle measuring plane mirror interferometric system in accordance with claim 65 wherein said tilted shear plate means comprises a tilted glass substrate having mutually parallel optically flat surfaces, with said sets of regions and coatings being disposed on said optically flat surfaces.

67. An angle measuring plane mirror interferometric system in accordance with claim 32 wherein said tilted shear plate comprises both said first and second set of regions and coatings.

68. An angle measuring plane mirror interferometric system in accordance with claim 67 wherein said tilted shear plate means comprises a tilted glass substrate having mutually parallel optically flat surfaces, with said sets of regions and coatings being disposed on said optically flat surfaces.

69. An angle measuring plane mirror interferometric system in accordance with claim 31 wherein said tilted shear plate means comprises a tilted glass substrate having mutually parallel optically flat surfaces, with said set of regions and coatings being disposed on said optically flat surfaces.

70. An angle measuring plane mirror interferometric system in accordance with claim 32 wherein said tilted shear plate means comprises a tilted glass substrate having mutually parallel optically flat surfaces, with said sets of regions and coatings being disposed on said optically flat surfaces.

71. An angle measuring plane mirror interferometric system in accordance with claim 11 wherein said tilted shear plate means comprises a tilted glass substrate having mutually parallel optically flat surfaces.

72. An angle measuring plane mirror interferometric system in accordance with claim 26 wherein said tilted shear plate means comprises a tilted glass substrate having mutually parallel optically flat surfaces.

73. An angle measuring plane mirror interferometric system in accordance with claim 11 wherein all of said beams are in a single plane.

74. An angle measuring plane mirror interferometric system in accordance with claim 73 wherein all of said beams are optical beams and all of said optical beams are in a single plane.

75. An angle measuring plane mirror interferometric system in accordance with claim 26 wherein all of said beams are in a single plane.

76. An angle measuring plane mirror interferometric system in accordance with claim 75 wherein all of said beams are optical beams and all of said optical beams are in a single plane.

77. An angle measuring plane mirror interferometric system in accordance with claim 1 wherein said means for converting said input beam into two separated parallel orthogonally polarized beams comprises a beamsplitter/beam folder assembly means.

78. An angle measuring plane mirror interferometer in accordance with claim 73 wherein said beamsplitter/beam folder assembly means comprises a right angle prism and a rhomboid prism.

79. An angle measuring plane mirror interferometric system in accordance with claim 77 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

80. An angle measuring plane mirror interferometric system in accordance with claim 79 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

81. An angle measuring plane mirror interferometric system in accordance with claim 16 wherein said means for converting said input beam into said two separated parallel orthogonally polarized beams comprises a beamsplitter/beam folder assembly means.

82. An angle measuring plane mirror interferometer in accordance with claim 81 wherein said beamsplitter/beam folder assembly means comprises a right angle prism and a rhomboid prism.

83. An angle measuring plane mirror interferometric system in accordance with claim 81 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

84. An angle measuring plane mirror interferometric system in accordance with claim 83 wherein said beamsplitter/beam folder assembly means comprises a first set of regions of antireflection and polarizing coatings, said means for converting said input beam into said separated parallel orthogonally polarized output beams comprising said beamsplitter/beam folder assembly means first set of regions and coatings.

85. An angle measuring plane mirror interferometric system in accordance with claim 1 wherein said means for converting said two separated parallel orthogonally polarized beams into said two same polarized separated parallel beams comprises a half-wave retardation plate means.

86. An angle measuring plane mirror interferometric system in accordance with claim 16 wherein said means for converting said two separated parallel orthogonally polarized beams into said two polarized separated parallel beams comprises a half-wave retardation plate means.

87. An angle measuring interferometric system in accordance with claim 1 wherein said means for causing each of said separated parallel same polarized beams to be reflected once by each one of said pair of angularly variable plane mirrors comprises a polarizing beam splitter means and a retroreflector means.

88. An angle measuring plane mirror interferometric system in accordance with claim 87 wherein said means for causing each of said separated parallel same polarized beams to be reflected once by each one of said pair of angularly variable plane mirrors further comprises a quarter-wave retardation plate means.

89. An angle measuring plane mirror interferometric system in accordance with claim 16 wherein said means for causing each of said separated parallel same polarized beams to be reflected once by each one of said pair of angularly varaible plane mirrors comprises a polarizing beam splitter means and a retroreflector means.

90. An angle measuring plane mirror interferometric system in accordance with claim 89 wherein said means for causing each of said separated parallel same polarized beams to be reflected once by each one of said pair of angularly variable plane mirrors further comprises a quarter-wave retardation plate means.

91. An angle measuring plane mirror interferometric system in accordance with claim 1 wherein said means for converting said two separated parallel same polarized output beams into said two separated parallel orthogonally polarized output beams comprises a half-wave retardation plate means.

92. An angle measuring plane mirror interferometric system in accordance with claim 16 wherein said means for converting said two separated parallel same polarized output beams into said two separated parallel orthogonally polarized output beams comprises a half-wave retardation plate means.

93. An angle measuring plane mirror interferometric system in accordance with claim 1 wherein said means for producing said electrical measurement signal comprises a polarizer means for mixing said single output beam orthogonal components.

94. An angle measuring plane mirror interferometric system in accordance with claim 93 wherein said means for producing said electrical measurement signal further comprises a photoelectric detector.

95. An angle measuring plane mirror interferometric system in accordance with claim 16 wherein said means for producing said electrical measurement signal further comprises a photoelectric detector.

96. An angle measuring plane mirror interferometric system in accordance with claim 95 wherein said means for producing said electrical measurement signal further comprises a polarizer means for mixing said single output beam orthogonal components.

97. An angle measuring plane mirror interferometric system in accordance with claim 79 wherein said means for converting said two separated parallel orthogonally polarized beams into said two same polarized separated parallel beams comprises a half-wave retardation plate means.

98. An angle measuring plane mirror interferometric system in accordance with claim 83 wherein said means for converting said two separated parallel orthogonally polarized beams into said two same polarized separated parallel beams comprises a half-wave retardation plate means.

99. An angle measuring plane mirror interferometric system in accordance with claim 79 wherein said means for causing each of said separated parallel same polarized beams to be reflected once by each one of said pair of angularly variable plane mirrors comprises a polarizing beam splitter means and a retroreflector means.

100. An angle measuring plane mirror interferometric system in accordance with claim 99 wherein said means for causing each of said separated parallel same polarized beams to be reflected once by each one of said pair of angularly variable plane mirrors further comprises a quarter-wave retardation plate means.

101. An angle measuring plane mirror interferometric system in accordance with claim 100 wherein said means for converting said two separated parallel same polarized output beams into said two separated parallel orthogonally polarized output beams comprises a half-wave retardation plate means.

102. An angle measuring plane mirror interferometric system in accordance with claim 101 wherein said means for producing said electrical measurement signal comprises a polarized means for mixing said single output beam orthogonal components.

103. An angle measuring plane mirror interferometric system in accordance with claim 83 wherein said means for causing each of said separated parallel same polarized beams to be reflected once by each one of said pair of angularly variable plane mirrors comprises a polarizing beam splitter means in a retroreflector means.

104. An angle measuring plane mirror interferometric system in accordance with claim 100 wherein said means for causing each of said separated parallel same polarized beams to be reflected once by each one of said pair of angularly variable plane mirrors further comprises a quarter-wave retardation plate means.

105. An angle measuring plane mirror interferometric system in accordance with claim 104 wherein said means for converting said two separated parallel same polarized output beams into said two separated parallel orthogonally polarized output beams comprises a half-wave retardation plate means.

106. An angle measuring plane mirror interferometric system in accordance with claim 105 wherein said means for producing said electrical measurement signal comprises a polarizer means for mixing said single output beam orthogonaly components.

107. An angle measuring plane mirror interferometric system in accordance with claim 1 wherein said source means comprises a laser.

108. An angle measuring plane mirror interferometric system in accordance with claim 16 wherein said source means comprises a laser.

109. An angle measuring plane mirror interferometric system in accordance with claim 1 wherein one of said pair of angularly variable plane mirrors is fixed and comprises a reference mirror and the other of said pair of plane mirrors is tiltable for providing said variable angle between said pair of angularly variable plane mirrors.

110. An angle measuring plane mirror interferometric system in accordance with claim 109 wherein said source means comprises a laser.

111. An angle measuring plane mirror interferometric system in accordance with claim 16 wherein one of said pair of angularly variable plane mirrors is fixed and comprises a reference mirror and the other of said pair of plane mirrors is tiltable for providing said variable angle between said pair of angularly variable plane mirrors.

112. An angle measuring plane mirror interferometric system in accordance with claim 111 wherein said source means comprises a laser.

113. An angle measuring plane mirror interferometric system in accordance with claim 1 wherein all of said beams are in a single plane.

114. An angle measuring plane mirror interferometric system in accordance with claim 113 wherein all of said beams are optical beams and all of said optical beams are in a single plane.

115. An angle measuring plane mirror interferometric system in accordance with claim 16 wherein all of said beams are in a single plane.

116. An angle measuring plane mirror interferometric system in accordance with claim 115 wherein all of said beams are optical beams and all of said optical beams are in a single plane.

117. An angle measuring plane mirror interferometric system in accordance with claim 77 wherein said beamsplitter/beam folder assembliy means comprises a first set of regions of antireflection and polarizing coatings, said means for converting said two separated parallel orthogonally polarized output beams into said single output beam comprising said beamsplitter/beam folder assembly means first set of regions and coatings, said beamsplitter/beam folder assembly means further comprising a second set of regions of antireflection and polarizing coatings, said second set of regions and coatings comprising said input beam converting means.

118. An angle measuring plane mirror interferometric system in accordance with claim 117 wherein said first and second regions of polarizing coatings comprise different portions of a common polarizing coating, said beamsplitter/beam folder assembly means comprising a common beamsplitter/beam folder assembly means comprising a common beamsplitter/beam folder assembly for converting said input beam and said output beam in said angle measuring plane mirror interferometric system.

119. An angle measuring plane mirror interferometric system in accordance with claim 118 wherein said common beamsplitter/beam folder assembly comprises beam entrance and exit surfaces, said first and second regions of antireflection coatings being on said entrance and exit surfaces.

120. An angle measuring plane mirror interferometric system in accordance with claim 119 wherein said beamsplitter/beam folder assembly means comprises a right angle prism and a rhomboid prism.

121. An angle measuring plane mirror interferometric system in accordance with claim 117 wherein said means for causing each of said separated parallel same polarized beams to be reflected once by each one of said pair of angularly variable plane mirrors comprises a polarizing beam splitter means and a retroreflector means.

122. An angle measuring plane mirror interferometric system in accordance with claim 121 wherein said means for causing each of said separated parallel same polarized beams to be reflected once by each one of said pair of angularly variable plane mirrors further comprises a quarter-wave retardation plate means.

123. An angle measuring plane mirror interferometric system in accordance with claim 122 wherein said means for converting said two separated parallel same polarized output beams into said two separated parallel orthogonally polarized output beams comprises a half-wave retardation plate means.

124. An angle measuring plane mirror interferometric system in accordance with claim 117 wherein said source means comprises a laser.

125. An angle measuring plane mirror interferometric system in accordance with claim 117 wherein one of said pair of plane mirrors is fixed and comprises a reference mirror and the other of said pair of plane mirrors is tiltable for providing said angle distance between said pair of angularly variable plane mirrors.

126. An angle measuring plane mirror interferometric system in accordance with claim 117 wherein all of said beams are optical beams, said optical beams being in a plurality of planes, with a given optical beam being in a given plane.

127. An angle measuring plane mirror interferometric system in accordance with claim 126 wherein said source means comprises a laser.

128. An angle measuring plane mirror interferometric system in accordance with claim 78 wherein said beamsplitter/beam folder assembly means comprises for providing said pair of orthogonally polarized frequency components with said phase difference "$\delta$" in accordance with the expression $$\delta = \frac{4\pi n h}{\sqrt{2}\,\lambda}\left[\frac{\sin 2\theta}{n} + \sqrt{1 - \left(\frac{\sin 2\theta}{n}\right)^2} - 1\right]$$

wherein "h" is the thickness of the rhomboid prism, "n" is the refractive index of the rhomboid prism, "$\lambda$" is the wavelength of said input beam source means, and "$\theta$" is the angular tilt of said pair of plane mirrors with respect to each other.

129. An angle measuring plane mirror interferometric system in accordance with claim 128 wherein said angular change "$\Delta\theta$" for small variations in said angular tilt is defined by the expression $$\Delta\theta = \frac{\sqrt{2}}{2}\left(\frac{\lambda}{4\pi h}\right)\Delta\delta$$

where "$\Delta\delta$" is the variation in said phase difference.

130. An angle measuring plane mirror interferometric system in accordance with claim 129 wherein said source means comprises a laser.

131. An angle measuring plane mirror interferometric system in accordance with claim 130 wherein one of said pair of angularly variable plane mirrors is fixed and comprises a reference mirror and the other of said pair of plane mirrors is tiltable for providing said variable angle between said pair of angularly variable plane mirrors.

132. An angle measuring plane mirror interferometric system in accordance with claim 128 wherein one of said pair of angularly variable plane mirrors is fixed and comprises a reference mirror and the other of said pair of plane mirrors is tiltable for providing said variable angle between said pair of angularly variable plane mirrors.

133. An angle measuring plane mirror interferometric system in accordance with claim 129 wherein said source means comprises a laser.

134. An angle measuring plane mirror interferometric system in accordance with claim 133 wherein one of said pair of angularly variable plane mirrors is fixed and comprises a reference mirror and the other of said pair of plane mirrors is tiltable for providing said variable angle between said pair of angularly variable plane mirrors.

135. An angle measuring plane mirror interferometric system in accordance with claim 129 wherein one of said pair of angularly variable plane mirrors is fixed and comprises a reference mirror and the other of said pair of plane mirrors is tiltable for providing said variable angle between said pair of angularly variable plane mirrors.

136. An angle measuring plane mirror interferometric system in accordance with claim 81 wherein said beamsplitter/beam folder assembly means comprises a first set of regions of antireflection and polarizing coatings, said means for converting said two separated parallel orthogonally polarized output beams into said single output beam comprising said beamsplitter/beam folder assembly means first set of regions and coatings, said beamsplitter/beam folder assembly means further comprising a second set of regions of antireflection and polarizing coatings, said second set of regions and coatings comprising said input beam converting means.

137. An angle measuring plane mirror interferometric system in accordance with claim 136 wherein said first and second regions of polarizing coatings comprise different portions of a common polarizing coating, said beamsplitter/beam folder assembly means comprising a common beamsplitter/beam folder assembly for converting said input beam and said output beam in said angle measuring plane mirror interferometric system.

* * * * *